United States Patent [19]

Brendley, Jr. et al.

[11] Patent Number: 5,403,798
[45] Date of Patent: Apr. 4, 1995

[54] DEEP OXIDATION OF HYDROCARBON COMPOUNDS WITH DOPED POROUS CARBONACEOUS MATERIALS

[75] Inventors: William H. Brendley, Jr., Hatboro, Pa.; Russell S. Drago; Krzysztof Jurczyk, both of Gainsville, Fla.

[73] Assignee: Rohm and Haas Company, Philadelphia, Pa.

[21] Appl. No.: 938,769

[22] Filed: Sep. 3, 1992

Related U.S. Application Data

[63] Continuation-in-part of Ser. No. 721,763, Jun. 28, 1991, Pat. No. 5,344,630.

[51] Int. Cl.$^6$ .......................... B01J 8/02; B01D 53/36
[52] U.S. Cl. ................................. 502/38; 423/245.3; 588/205
[58] Field of Search ................. 423/210, 245.1, 245.3, 423/240, DIG. 20; 502/38; 588/205

[56] References Cited

U.S. PATENT DOCUMENTS 4,059,677 11/1977 Sare et al. ..................... 423/481

OTHER PUBLICATIONS

Grunewald et al. *Journal of Molecular Catalysis*, 58 (1990) pp. 227–233 (no month).
Grunewald et al. *Journal of Molecular Catalysis*, 60 (1990) pp. 239–253 (no month).
Derwent Abstract of German (East) Patent DD-0280395 no date.
Derwent Abstract of Sweden Patent SE-0464392 no date.
Derwent Abstract of Japan Patent JP-03118835 no date.
Derwent Abstract of Japan Patent JP-02143010 no date.
Derwent Abstract of Japan Patent JP-02075345 no date.
Derwent Abstract of U.S. Pat. No. 4,977,128 no date.
Ambersorb Carbonaceous Adsorbents–Oct. 1990–pp. 1–11.
The Chemical Society of Japan, Nippon Kagakukai, 1990 pp. 2039–2042.
Royal Society of Chemical, Journal of the Chemistry Society, Faraday Trans, 1991, vol. 87, pp. 2493–2499 (no month).
Applied Catalysis Vo., 66, No. 2–Nov. 19, 1990–pp. 337–358.
The Journal of Catalysis, vol. 123, No. 1, May 1990, pp. 477–485.

*Primary Examiner*—Michael Lewis
*Assistant Examiner*—Stuart L. Hendrickson
*Attorney, Agent, or Firm*—John E. Taylor, III

[57] ABSTRACT

A method for oxidizing hydrocarbon compounds comprising passing a mixture of the hydrocarbon compound and excess oxygen over a catalyst comprising a carbonaceous substrate doped with a compound selected from the group consisting of metal oxide, metal oxyhalide, and precursors which form metal oxide and metal oxyhalide, and blends thereof under mild reaction conditions. The temperature of the reaction is below about 300° C.

14 Claims, No Drawings

DEEP OXIDATION OF HYDROCARBON COMPOUNDS WITH DOPED POROUS CARBONACEOUS MATERIALS

This application is a continuation-in-part of application Ser. No. 721,763, filed June 28, 1991, now U.S. Pat. No. 5,344,630.

BACKGROUND OF THE INVENTION

1. Field of the Invention

The present invention relates to the oxidation of hydrocarbon compounds. In particular, the invention relates to a method for essentially completely oxidizing hydrocarbon compounds to carbon monoxide, carbon dioxide, and water in the presence of a carbonaceous catalyst.

2. Description of Related Art

Hydrocarbon compounds are useful for a number of purposes. In particular, hydrocarbon compounds are useful, inter alia, as fuels, solvents, degreasers, cleaning agents, and polymer precursors. The most important source of hydrocarbon compounds is petroleum crude oil. Refining of crude oil into separate hydrocarbon compound fractions is a well-known processing technique. Also, many uses of hydrocarbon compound yield gaseous and liquid streams containing hydrocarbon compounds. These streams must be discarded or processed for re-use. Thus, there are many opportunities for hydrocarbon compounds to escape into the environment.

Hydrocarbon compounds often are discarded improperly, e.g., without regard for the damage the compound may do in the environment. For example, hydrocarbon compounds often are disposed of merely by discarding the compound into the environment. Typical of such disposal techniques are venting to the atmosphere, terrestrial burial (in containers or not), discharge into the open ocean, burning, and deep-well injection. These techniques contaminate soil, groundwater, and air with hydrocarbon compounds.

Processing and storage of hydrocarbon compounds often leads to contamination of the environment through accident, leaks, and evaporative losses, even though the processor or user of the compounds exercises the utmost care in handling the compounds. For example, accidental spills often contaminate soil, groundwater, and the air. Similarly, leaks from processing equipment allow hydrocarbon compounds to escape into the environment. Hydrocarbon compounds also escape into the environment during use, e.g., by evaporation or spillage, or by design, such as during evaporative drying of protective coatings such as oil-based paints and enamels.

Hydrocarbon compounds not only are deleterious to the environment, but also can be hazardous to human health. For example, many hydrocarbon compounds are mucosal irritants, and some are known or suspected carcinogens.

It is desirable, therefore, to remove hydrocarbon compounds from the environment. In particular, it is desirable to remove such hydrocarbon compounds from air supplied as breathing air to, for example, personnel chambers, portable air packs, and the like. Examples of such personnel chambers include process plant control rooms and other controlled-environment rooms, such as the 'clean room' in a silicon chip manufacturing plant.

Methods for eliminating hydrocarbon from the environment are known. For example, catalytic incinerators are known in the art. Various catalysts are used in such incinerators. Many times, the hydrocarbon to be destroyed is removed from a liquid by countercurrent stripping with air, nitrogen, or other gas stream which will carry hydrocarbon. Also, hydrocarbon often is removed from soil by passing a gas, such as air, through the contaminated soil. The gas containing hydrocarbon vapor then is passed over the catalyst, typically at elevated (significantly above 250°–300° C.) temperature, with residence times sufficient to oxidize the hydrocarbon. In addition to the additional energy cost incurred in heating catalyst, reactants, and inert material carried with the reactants (such as nitrogen with the oxygen in air), such high-temperature methods require that the material of construction of the processing apparatus be capable of resisting the temperature utilized. Further, at higher temperatures, there exists the possibility of producing noxious or deleterious compositions, such as $NO_x$ if nitrogen is present during the oxidation, which essentially are not produced at lower temperatures.

A catalyst for complete oxidation of gaseous hydrocarbon mixtures is disclosed in DD 280,395. The catalyst comprises an oxidation component, preferably CuO, and an adsorption component, preferably an aluminosilicate. Processing temperature preferably is 407°–577° C. A plurality of catalysts comprising noble metals also is known. For example, catalyst comprising a platinum-group element on a high purity magnesia single crystal fine powder substrate, or the magnesia alone, is disclosed in JP 03/118,835 (1991). This document discloses that the substrate has a specific surface area of between about 5 and 170 $m^2/g$. In JP 03/122,402 (1991), a catalyst having a first layer consisting of powdered magnesia single crystal powder to which a platinum-group metal has been added, is layered with undoped superfine magnesia powder. Apparently, the doped catalyst is active at temperatures between about 300°–800° C.; the undoped catalyst is active at temperatures between about 700°–1500° C. This system is said to be suitable for completely burning lower alkanes at a temperature of at least about 300° C. in the first stage without $NO_x$ emissions.

The catalysts disclosed in JP 02/169,029 and 02/169,030 (1990) comprise noble metal on an inorganic fibrous carrier. The carrier can be alumina, silica, zirconia, titania, and suitable blends. The catalyst is said to provide high activity because the noble metal is uniformly dispersed and because the substrate is resistant to degradation of the porosity, and thus maintains high specific surface area. The noble metal-containing catalyst disclosed in SE 464,392 also is said to retain activity because it is resistant to sintering. The catalyst substrate is aluminium oxide having a specific surface area less than 75 $m^2/g$, in which at least 50 percent of the surface area contributed by the pores is contributed by pores having diameter greater than 100 Angstrom. The noble metals are deposited on the substrate.

According to U.S. Pat. No. 4,977,128, high specific surface area is retained, even at temperature exceeding 1000° C., by catalyst comprising platinum or rhodium deposited on a substrate containing aluminium and barium. Steam treatment of a substrate to increase the specific surface area and therefore the activity of the resultant catalyst, is disclosed in JP 02/143,010 (1990). The substrate is thermally conductive; the raw material for the substrate comprises an element selected from the group including manganese, magnesium, iron, copper, cobalt, and chrome. JP 02/078,436 (1990) discloses a three-component, layered catalyst for use in a gas turbine combustor comprises rare earth, alkaline earth metal, and their oxides; magnesium, silica, and their oxides; and heavy metals and their oxides; all on a porous support.

Researchers also have studied structurally-modified catalysts, typically for catalysis of reactions which proceed at high (above about 500° C.) temperature. Noble metal (platinum, palladium) supported on alumina show measurable methane oxidation activity at 300° C., but require a temperature of about 480° C. to achieve complete oxidation, according to Briot, Catalytic oxidation of methane over palladium supported on alumina, *Applied Catalysis*, 68 (1991) 301–314, and a platinum/nickel/alumina requires a temperature of 430° C. to oxidize a hydrocarbon mixture, according to Agarwal, Deep oxidation of hydrocarbons, *Applied Catalysis A: General*, 81 (1992) 239–255. Agarwal also discloses that a ceria-promoted hopcalite (mixture of manganese and copper oxides) catalyst has significant oxidation activity at temperature exceeding 300° C. Significant activity loss was experienced at temperatures less than 300° C. The hydrocarbon stream comprised water and a mixture of nine hydrocarbons having a total concentration of 500 ppm.

Research also has been directed to alumina-supported catalysts, in which about 5 wt percent CuO is supported on alumina or on $ZnAl_2O_4$. Such catalysts require a reaction temperature of at least about 347° C. to achieve even minimal conversion of methane. Marion, Physicochemical Properties of Copper Oxide Loaded Alumina in Methane Combustion, *J. Chem. Soc. Faraday Trans.*, 86(17) (1990), 3027–3032, and Marion, Catalytic Properties of Copper Oxide supported on Zinc Aluminate in Methane Combustion, *J. Chem. Soc. Faraday Trans.*, 87(11) (1991), 1795–1800. Oxides of cobalt, copper, and chrome also have been deposited on alumina substrate for use as catalyst for methane oxidation.

Adsorbents for hydrocarbons also are available. Methods for regenerating saturated adsorbents used to remove harmful hydrocarbon compounds from water, soil, or air are known. Typical regeneration methods include steam regeneration and solvent regeneration. These methods have the drawback that although the adsorbent may be regenerated, the steam or solvent effluent stream remains contaminated with the harmful hydrocarbon compound and must be treated before disposal.

SUMMARY OF THE INVENTION

The present invention is useful in the disposal of hydrocarbon compounds and in the regeneration of saturated carbonaceous adsorbents that have been used to remove hydrocarbon compounds from soil, water and other liquids, and air.

The present invention provides a process for oxidizing hydrocarbon compounds. It has been discovered that hydrocarbon compounds are essentially completely oxidized by passing a mixture of hydrocarbon compound and excess oxygen over a catalyst at relatively mild temperatures. The catalyst comprises a doped carbonaceous substrate having a pore size, pore volume, and surface area effective to completely oxidize hydrocarbon compounds. The dopant is selected from the group consisting of metal oxides, metal oxyhalides, precursors which form metal oxide and metal oxyhalide, and blends thereof. The temperature of the catalytic reaction is at most about 300° C.

DETAILED DESCRIPTION

The present invention is based on the discovery that carbonaceous substrates doped with a compound selected from the group consisting of metal oxide, metal oxyhalide, precursors which form metal oxide and metal oxyhalide, and blends thereof, are useful in the essentially complete catalytic oxidation of hydrocarbon compounds. Essentially complete oxidation of the hydrocarbon compound can be realized at relatively mild temperatures in the presence of such catalyst. Also, doped carbonaceous adsorbents which have been used to remove hydrocarbon compounds from soil, water and other liquids, or air can be regenerated by oxidation at relatively mild reaction temperatures. The catalytic oxidation of hydrocarbon compounds is effected either by passing a mixture containing oxygen and the hydrocarbon compound over the catalyst or by passing a stream of oxygen over doped carbonaceous adsorbent saturated with hydrocarbon material.

Throughout the specification and claims, the phrase "hydrocarbon compound", when used to describe a reactant to be oxidized in accordance with the method of the invention, means any compound susceptible of oxidation which consists of carbon and hydrogen. In particular, hydrocarbon compound which can be oxidized according to the present invention includes aromatics and aliphatic and alicyclic alkanes, alkenes, and alkynes. Thus, aromatic compounds and linear, branched, and cyclic alkane, alkene, and alkyne compounds can be oxidized in accordance with the method of the invention.

Often, mixtures of hydrocarbon compounds suitably are oxidized in accordance with the method of the invention. Mixtures of alkanes, alkenes, alkynes, and aromatic compounds can be oxidized in accordance with the method of the invention. For example, motor gasoline, diesel fuels, and jet fuels are mixtures comprising hydrocarbon compounds which can be oxidized in accordance with the method of the invention. Kerosine and mineral oils are additional examples of such hydrocarbon mixtures. Many such products known in the marketplace can be oxidized in accordance with the method of the invention.

Another source of mixtures of hydrocarbon compounds which are oxidizable in accordance with the method of the invention is the products resulting from the cracking (thermal or catalytic) of heavy hydrocarbons. Thus, hydrocarbon compounds of low volatility can be cracked, in the presence of cracking catalyst or by a thermal method, to form more volatile hydrocarbon compounds, which then can be oxidized in accordance with the method of the invention.

Oxidation of hydrocarbon compounds in accordance with the method of the invention would be particularly useful, for example, in a crude oil refining plant to ensure not only that essentially no hydrocarbon compound pollutes the environment, but also that air supplied to control rooms, for example, is free of hydrocarbons. Not only does this improve the working environment for refinery personnel, but also this reduces the chances of fire and explosion on the refinery site.

More specifically, the hydrocarbon compound can be selected from the group consisting of aliphatic alkanes, such as methane, ethane, propane, butanes, pentanes, methyl butanes, ethyl propane, and hexanes; alicyclic alkanes, such as cyclopropane, cyclobutane, cyclopentane, cyclohexane, methylcyclopentane, and dimethylcyclopentanes, and other alkanes having up to about 30 carbon atoms; aliphatic alkenes, including dienes, trienes, and tetraenes, such as ethene, propene, butene, 1- and 2-pentene, and hexenes; alicyclic alkenes, such as cyclopropene, cyclobutenes, cyclopentenes, and cyclohexenes; cyclobutadienes, cyclopentadienes, cycloheptatrienes, and cyclooctatetrene; and other alkenes having up to about 30 carbon atoms and at least 1 double bond; aliphatic alkynes, including those having 1 or more triple bonds, such as acetylene, propyne, butynes, pentynes, and hexynes; 2,4,6-octatriyne; and other alkynes having up to about 30 carbon atoms and at least 1 triple bond; and aromatics, such as benzene and benzene substituted with alkanes, such as toluene, ethylbenzene, and the xylenes; with alkenes, such as styrene, and with substituted alkenes, such as α-methylstyrene.

Specific hydrocarbon compounds essentially completely oxidized in accordance with the method of the present invention are alkanes which correspond to the formula $C_nH_{2(n+1-r)}$, wherein n is a whole number up to about 30, preferably from 1 to about 20 inclusive, more preferably no more than about 10, and most preferably no more than about 6; and r is a whole number equal to the number of rings in the compound; alkenes which correspond to the formula $C_mH_{2(m+1-r-d)}$, wherein m is a whole number up to about 30, preferably from 2 to about 20 inclusive, more preferably no more than about 10, and most preferably no more than about 6; r is as defined above; and d is a whole number equal to the number of double bonds in the compound; alkynes which correspond to the formula $C_pH_{2(p+1-2t-r)}$, wherein p is a whole number up to about 30, preferably from 2 to about 12 inclusive, more preferably no more than about 8, and most preferably no more than about 6; r is as defined above; and t is a whole number equal the number of triple bonds in the compound; compositions having both double and triple bonds, such as 1-cyclodecene-4-yne ($C_{10}H_{14}$); and aromatics which correspond to the formula

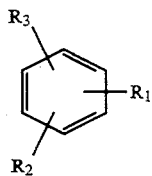

wherein $R_1$, $R_2$, and $R_3$ may be the same or different, and wherein each of $R_1$, $R_2$, and $R_3$ independently is selected from the group consisting of H, aliphatic (linear and branched) and alicyclic alkyl, alkylene, and alkyne hydrocarbons and aryl hydrocarbons having up to about 20 carbon atoms. Skilled practitioners recognize that in no event can the number of hydrogen atoms in a hydrocarbon compound be negative.

The stoichiometric quantities of oxygen required and carbon dioxide produced be calculated from the following formulae:

1. When the hydrocarbon compound is an alkane

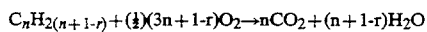

2. When the hydrocarbon compound is an alkene

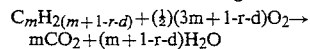

3. When the hydrocarbon compound is an alkyne

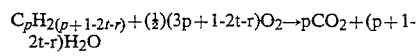

4. When the hydrocarbon compound is an aromatic, or contains at least 1 double bond and at least 1 triple bond, skilled practitioners can solve the stoichiometric equation. For example, for toluene, the equation would be as follows:

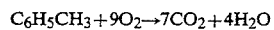

For 1-cyclodecen-4-yne, the equation would be as follows:

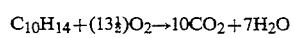

With the guidance provided herein, s killed practitioners will be able to determine the stoichiometrically-required quantity of oxygen.

The hydrocarbon compound essentially completely oxidized in accordance with the present invention is essentially completely oxidized to carbon monoxide, carbon dioxide, and water. The expression "essentially complete oxidation" means at least about 70 percent of the hydrocarbon compound has been oxidized. Preferably, about 80 percent; more preferably about 90 percent; and most preferably at least about 99 percent of the hydrocarbon compound has been converted. To ensure essentially complete oxidation, excess oxygen is required. The amount of oxygen used in the oxidation of the hydrocarbon compounds in accordance with the present method should be in a quantity sufficient to incinerate (oxidize) the specific quantity of hydrocarbon compound contained in the supply stream. The quantity of oxygen should be at least stoichiometrically sufficient to oxidize substantially all of the carbon and hydrogen content of the hydrocarbon compound to carbon dioxide and water, respectively. Flow rates (contact time) can be adjusted to accommodate different hydrocarbon compound feed rates and reaction temperatures.

Generally, the quantity of oxygen used will be far in excess of the stoichiometric quantity required to ensure substantially complete oxidative decomposition of the hydrocarbon compound. The quantity of excess oxygen used can vary provided that sufficient quantities are made available to accomplish the aforesaid described degree of oxidation. The oxygen can be provided by utilizing air, oxygen, or oxygen-enriched air. The oxygen-containing stream also can be mixed with steam.

Selected hydrocarbon compounds, for example phenanthrene and other higher molecular weight hydrocarbon compounds, may be resistant to oxidation in accordance with the method of the invention. Therefore, although it is possible (typically by recycling incompletely oxidized hydrocarbon compound) to essentially completely oxidize such compounds in accordance with the method of the invention, a supplemental oxidant can be utilized to accelerate the essentially complete oxidation of such hydrocarbon compounds. Suitable supplemental oxidants include hydrogen peroxide ($H_2O_2$) and nitrogen dioxide ($NO_2$). Such supplemental oxidants are optional additives to practice of the method of the invention.

In one embodiment of the process of the present invention, the oxygen is bubbled through liquid containing the hydrocarbon compound and the resultant gas stream, which is saturated with respect to the hydrocarbon compounds, then is passed over the catalyst. Lower feed rates of the hydrocarbon compounds can be attained by passing the oxygen over a reservoir of liquid (heated or cooled as necessary) comprising the hydrocarbon compound, to obtain a gaseous feed stream which is unsaturated with respect to the hydrocarbon compound. In yet another embodiment, the hydrocarbon compound is delivered as a liquid and volatilized in a precatalyst reactor zone. The vapor then is carded to the catalyst. This method allows for feed rates greater than those achieved by bubbling oxygen-containing gas through the reactant because the concentration of the reactant in the vapor is not limited by equilibrium (saturation) considerations. In a still further embodiment, the catalyst is saturated with a hydrocarbon compound (for example, by using the catalyst to remove hydrocarbon compounds from soil, water and other liquid, or air), and then heated to reaction temperature while passing oxygen, air, or mixtures of steam with oxygen or air, and optionally including supplemental oxidants, over it to oxidize the hydrocarbon compound and regenerate the catalyst.

The carbonaceous substrate of the catalyst to be employed in the method of this invention comprises any form of carbon which, when doped with at least one metal oxide, metal oxyhalide, or a precursor of either, catalyzes oxidation of a hydrocarbon compound to carbon dioxide and water. Thus, carbon derived from any animal, plant or mineral source can be used. Examples of suitable carbon substrates include, but are not limited to, the following: activated carbons such as those derived from coal, wood, coconut shells, lignin or animal bones; carbon blacks such as those derived from gas phase pyrolysis of hydrocarbons; natural or synthetic graphites or graphite whiskers; supported pyrolyric carbons wherein the support is an inorganic refractory oxide, inorganic phosphate, inorganic boride, or inorganic nitride; cokes such as those obtained from the destructive distillation of bituminous coal, petroleum, and coal-tar pitch; and chars and polymeric carbons prepared by pyrolysis of resinous polymers. Additionally, it is acceptable to employ high surface area carbons prepared by direct chemical activation. Such chemically activated, high surface area carbons are described by T. M. O'Grady and A. N. Wennerberg in *Petroleum Derived Carbons*, American Chemical Society Symposium Series, Vol. 303, J. D. Bacha et al., eds., American Chemical Society Publications, Washington, D.C., 1986. The preparation of these high surface area carbons involves reacting petroleum coke or other carbonaceous sources with excess potassium hydroxide at about 450° C. to obtain an intermediate product which is subsequently pyrolyzed at about 850° C. to the high surface area carbon.

Some of the above-identified carbons, for example the activated carbons and graphites, are "soft" carbons which are known to break apart easily and slough dust particles. Others of the above-identified carbons are non-graphitizable or "hard" carbons, which are known to possess good structural integrity and do not slough dust particles. The carbons prepared by the pyrolysis of resinous polymers are an example of hard carbons. Preferably, the substrate employed in the process of this invention is a hard carbon. More preferably, the substrate employed in the process of this invention is a hard carbon prepared by the pyrolysis of a resinous polymer.

The hard carbon substrates which are prepared by the pyrolysis of resinous polymers are known in the art. The substrates and their method of preparation are described in U.S. Pat. No. 4,040,990, which is incorporated herein by reference. As described therein, these carbons are partially pyrolyzed resin particles preferably in the form of hard beads or spheres. They are produced by the controlled decomposition of a synthetic polymer. The pyrolysis, as described in U.S. Pat. No. 4,040,990, is generally conducted in an inert atmosphere comprised of, for example, helium, argon, or nitrogen. Preferably, the polymer is heated rapidly to a maximum temperature in the range from about 300° C. to about 900° C.; heated at the maximum temperature for a period of up to about 20 minutes; and cooled to room temperature before exposing to air. For the purposes of this invention, maximum temperatures of up to about 1200° C. are also suitable, and longer heating times are not deleterious.

Any of the many synthetic polymers, disclosed in U.S. Pat No. 4,040,990 and incorporated herein by reference, can be employed in preparing the hard carbon catalyst for the process of this invention. Preferred are polymers derived from aliphatic and aromatic materials which are ethylenically unsaturated. Preferably, the polymer is cross-linked, because cross-linking stabilizes the polymer thermally and leads to greater carbon yields. Preferably also, the polymer contains a carbon-fixing moiety, such as a cation, anion, strong base, weak base, sulfonic acid, carboxylic acid, halogen, or alkylamine moiety. The more preferred polymers include polyvinylidene chloride, and macroreticular ion-exchange resins derived from aliphatic and aromatic materials which are ethylenically unsaturated. Most preferably, the polymer is a polystyrene divinylbenzene sulfonic acid ion-exchange resin. In addition to the polymers disclosed in U.S. Pat. No. 4,040,990, any of the polysulfonated polymers disclosed in U.S. Pat. No. 4,839,331, and incorporated herein by reference, can be employed in preparing the hard carbon catalyst for the process of the invention.

The preferred hard carbon substrate, which is prepared by the pyrolysis of a resinous polymer, contains at least three distinct sets of pores of differing average size. One set comprises large pores, macropores, which originate from the resinous starting material, and typically range in size of at least 500 Angstroms in average diameter. The second set comprises intermediate pores, mesopores, which typically range in size from about 20 Angstroms to about 500 Angstroms. The third set and smallest pores, micropores, originate on pyrolysis of the resinous polymer. These small pores are typically less than about 20 Angstroms in average diameter; however, the exact size depends on the temperature of pyrolysis. In addition to pore size, the pyrolysis temperature also controls total pore volumes. Generally, as the pyrolysis temperature increases, the micropore volume increases. However, at pyrolysis temperatures about 900° C., the micropore volume is low. It is believed that the micropores control the product selectivities in the deep oxidation reaction; however, such a theory should not be construed to be binding or limiting of the scope of the invention.

The macropore volume of the carbon substrate of this invention should be at least 0.10 ml/g; preferably in the range from about 0.10 ml/g to about 0.35 ml/g; more preferably in the range from about 0.15 ml/g to about 0.30 ml/g; and most preferably in the range from about 0.20 ml/g to about 0.25 ml/g. The mesopore volume of the carbon substrate of the present invention is typically in the range from about 0.05 ml/g to about 0.30 ml/g; preferably in the range from about 0.10 ml/g to about 0.20 ml/g; and most preferably in the range from about 0.12 ml/g to about 0.18 ml/g. The micropore volume of the pyrolyzed carbon substrate of this invention is at least about 0.10 ml/g. More preferably, the micropore volume of the pyrolyzed carbon substrate of this invention is in the range from about 0.15 ml/g to about 0.35 ml/g; most preferably in the range from about 0.18 ml/g to about 0.32 ml/g.

The measurement of porosity is derived from surface area and pore volume measurements obtained on any suitable instrument, such as a Micromeritics DIGI-SORB® 2500 unit, using nitrogen as the adsorbate at the boiling point of nitrogen, 77K. The porosity of the carbon substrate of the present invention is a function of the pyrolysis conditions, the activation of the substrate, and the porosity of the initial co-polymer used to make the catalyst. The methods used to obtain surface area and pore volumes are described by S. Lowell in Introduction to Powder Surface Area (John Wiley & Sons, 1979), or in the manuals provided with the DIGI-SORB® 2500 instrument made by the Micromeritics Instrument Corporation.

The carbon substrate of this invention can possess any surface area provided the catalyst is active in the deep oxidation reaction. Generally, the carbon substrate possesses a surface area of at least about 10 $m^2/g$. Preferably, the carbon substrate possesses a surface area in the range from about 100 $m^2/g$ to about 2000 $m^2/g$; more preferably, in the range from about 400 $m^2/g$ to about 1500 $m^2/g$; most preferably in the range from about 600 $m^2/g$ to about 900 $m^2/g$. The surface area is measured by the Brunauer-Emmett-Teller (BET) method. The BET method is described by R. B. Anderson, in Experimental Methods in Catalytic Research, Academic Press, 1968, pp. 48-66.

The catalyst of the present invention also can possess a variety of pore volumes, pore sizes, and surface areas provided the catalyst is effective in completely oxidizing the hydrocarbon organic compound. The above-mentioned surface areas, pore sizes, and pore volumes are particularly preferred for the particular pyrolyzed hard carbon catalyst used in the oxidation of hydrocarbon compounds. As long as the pore volume, pore size, and surface area of the catalyst are effective in completely oxidizing the hydrocarbon compound, the particular source of carbon is not limited, provided only that the carbon substrate can be formed having the effective parameters. The pore volume, pore size, and surface area of the catalyst of the present invention can be altered by modifying the substrate reaction conditions. For example, the temperature of pyrolysis as well as the pore volume of the initial co-polymer can be adjusted to bring the pyrolyzed substrate to within the desired range. The skilled practitioner in the art will appreciate other known methods of modifying the parameters of the carbon catalyst in order to achieve the complete oxidation of the hydrocarbon compound.

Although the inventors do not wish to be bound by any theory, it is believed that the activity of the catalyst is related not only to the pore size, pore volume and surface area, but also to an interaction involving the redox activity and acidity of active sites of the substrate and the redox or Lewis acid activity of metal oxides, metal oxyhalides, and precursors which form metal oxide and metal oxyhalide within the pores of the catalyst. For example, washing the catalyst with dilute base substantially decreases the activity of the substrate without changing the pore volume. Again, the inventors do not wish to be bound by theory, but it is believed that the substrate may undergo redox reactions with the dopant, or it may disperse dopant, especially metal oxide, thus providing a large surface area for catalysis, without reacting with either dopant or hydrocarbon compound. The skilled practitioner will appreciate other known methods of modifying the redox activity and acidity of the catalyst. Accordingly, all parameters of the catalyst must be accounted for by the skilled practitioner when selecting the appropriate catalyst useful for the complete oxidation of hydrocarbon compound.

The catalyst of the present invention comprises carbonaceous substrate doped with a compound selected from the group consisting of metal oxides, metal oxyhalides, precursors which form metal oxide and metal oxyhalide, and blends thereof. A wide variety of metal oxide, metal oxyhalide, metal oxide precursor compound, and metal oxyhalide precursor compounds can be employed as dopants. Skilled practitioners recognize that a metal oxide precursor compound or a metal oxyhalide precursor compound can be utilized to provide the desired quantity of metal oxide or metal oxyhalide dopant, respectively. Such compounds typically are called dopant precursors. Typically, the dopants and precursor compounds are volatile or are soluble in solvents that disperse the compound over and into the pores of the carbonaceous substrate.

Such compounds may be active in the form added, or may be active as the oxide, hydroxide, or oxyhalide (typically, formed upon hydrolysis or decomposition). The halide is selected from the group consisting of fluoride, chloride, bromide, iodide, and blends thereof; preferably, the halide moiety is chloride. In particular, dopants are metal oxides and oxyhalides of the first row transition metals (Sc, Ti, V, Cr, Mn, Fe, Co, Ni, and Cu), zinc, tin, lead, niobium, zirconium, molybdenum, and related redox-active elements. Precursors which form the metal oxide or metal oxyhalide, typically by hydrolysis or decomposition, are compounds such as the nitrate, sulfate, carbonate, or other soluble salts of these metal oxides and metal oxyhalides. Particularly preferred dopants include $CrO_3$, $TiO_2$, MnO, CoO, $V_2O_5$, FeO, and ZnO. Preferred dopant precursors include $Ce(NO_3)_3$, $Cu(NO_3)_2$, $KMnO_4$, $Zn(NO_3)_2$, $Co(NO_3)_2$, and $Mn(NO_3)_2$, and the analogous sulfates and carbonates.

The doped catalysts of the present invention also have the ability to adsorb hydrocarbon compounds at ordinary temperatures normally near room temperature. These substrates are known to be useful in removing hydrocarbon compounds from the soil, water and other liquids, or air. The catalyst then can be regenerated by contacting the catalyst with oxygen at the reaction temperature to oxidize hydrocarbon organic compounds adsorbed on the catalyst and to reoxidize reduced metal oxides. The hydrocarbon compound is completely removed from the catalyst, and the reactor effluent is free of hydrocarbon compounds.

The process of the present invention is carded out at mild temperatures sufficient to complete the oxidation reaction. Typically, the reaction temperature is less than about 300° C.; preferably is between about 150° and 250° C., and more preferably between about 175° and 230° C. Reaction typically is carded out at atmospheric pressure.

The particular flow rates of reactants, temperatures and pressures of the reaction, and retention time of reactants all vary, depending upon the particular hydrocarbon compound. Those which decompose or oxidize less readily require slower feed rates and longer retention times in the reactor. Generally, increased conversion is achieved by increasing contact time and lowering reaction temperature.

It is also difficult to accurately predict the operating capacities of a particular catalyst for a multi-component system without results from an actual column study. Static adsorption isotherm data can be used to approximate the weight or volume of an adsorbent required at a given contaminant concentration level. Flow rate constraints can then be used to estimate how long the column can remain in service. The particular type of reactor also varies with the hydrocarbon compound oxidized. Generally, the reactor can be a standard fluid or fixed bed reactor designed to withstand attack by the products and reactants. The skilled practitioner in the art appreciates the manner in which these process condition and parameters can be modified.

Catalyst used in the method of the invention can be regenerated to essentially completely restore the catalytic activity. Although the inventors do not wish to be bound by theory, it is believed that regeneration not only removes deleterious deposits from the catalyst by oxidation, sublimation, and related processes, but also reoxidizes any reduced metal oxide. Catalyst regeneration is carded out by passing an oxygen-containing stream over the catalyst in the absence of hydrocarbon compound reactant in the feed stream at a temperature and for a period sufficient to essentially completely remove deleterious deposits from the catalyst and restore the activity thereto. Typically, a temperature between about 200° and 300° C., and a period of up to about 48 hours, are sufficient to essentially completely restore catalytic activity. A regeneration temperature higher than 300° C., for example, 350° C., can be utilized, but the period the catalyst is exposed to such higher temperatures should be limited to less than 48 hours. Such higher temperatures present the risk that a small percentage of the catalyst may be destroyed or otherwise rendered unsuitable for use as catalyst. With the information presented herein, skilled practitioners will be able to select adequate regeneration conditions.

The following examples further illustrate practice of the method of the invention.

EXAMPLES

Catalyst Preparation

The following method was utilized to prepare the catalysts used in Examples 1–18.

The desired concentration of metal oxide dopant was deposited on the substrate by filling the pores of the substrate with an aqueous solution of dopant precursor in quantity sufficient to achieve the desired dopant concentration. The pore-fried catalyst was aged for 12 hours, then heated in vacuum to 180° C. overnight. Table 1 sets forth the identities of the substrates, dopants, and dopant precursors, together with the dopant concentration on the resulting catalyst.

In each example, the desired quantity of catalyst was placed in a 10 mm diameter Pyrex® reaction tube and a bed of inert glass beads about 5 inches deep was placed over the catalyst. The quantity of catalyst also is set forth in Table 1. The temperature of the reactor was raised to 360° C. in a nitrogen flow, and the catalyst was maintained at this temperature for 12 hours. The temperature of the reactor then was reduced to the desired reaction temperature.

TABLE 1

| Example | Substrate | Dopant | Dopant Precursor | Dopant Conc., wt pct | Quantity of Catalyst, g |
|---|---|---|---|---|---|
| 1 | Ambersorb ® 572 | MnO | $Mn(NO_3)_2$ | 5 | 1.0 |
| 2 | Ambersorb ® 572 | CoO | $Co(NO_3)_2$ | 5 | 1.0 |
| 3 | Ambersorb ® 563 | MnO | $Mn(NO_3)_2$ | 5 | 1.0 |
| 4 | Ambersorb ® 572 | MnO | $Mn(NO_3)_2$ | 5 | 1.0 |
| 5 | Ambersorb ® 572 | CoO | $Co(NO_3)_2$ | 5 | 1.0 |
| 6 | Ambersorb ® 563 | MnO | $Mn(NO_3)_2$ | 5 | 1.0 |
| 7 | Ambersorb ® 572 | ZnO | $Zn(NO_3)_2$ | 5 | 1.0 |
| 8 | Ambersorb ® 563 | ZnO | $Zn(NO_3)_2$ | 10 | 1.0 |
| 9 | Ambersorb ® 572 | ZnO | $Zn(NO_3)_2$ | 5 | 2.0 |
| 10 | Ambersorb ® 572 | MnO | $Mn(NO_3)_2$ | 5 | 1.0 |
| 11 | Ambersorb ® 572 | CoO | $Co(NO_3)_2$ | 5 | 1.0 |
| 12 | Ambersorb ® 572 | MnO | $Mn(NO_3)_2$ | 5 | 1.0 |
| 13 | Ambersorb ® 563 | ZnO | $Zn(NO_3)_2$ | 10 | 1.0 |
| 14 | Ambersorb ® 572 | ZnO | $Zn(NO_3)_2$ | 5 | 2.0 |
| 15 | Ambersorb ® 572 | CoO | $Co(NO_3)_2$ | 5 | 1.0 |
| 16 | Ambersorb ® 563 | CoO | $Co(NO_3)_2$ | 5 | 2.0 |
| 17 | Kureha SARO pitch based beads | MnO | $Mn(NO_3)_2$ | 5 | 2.0 |
| 18 | Anderson AX21 | MnO | $Mn(NO_3)_2$ | 5 | 1.5 |

Example 1

Air saturated with hexane at 0° C. was passed through the catalyst at a temperature of 250° C. and a flow rate of 3 mL/min. The concentration of hexane in the air was about 2000 ppm. Gas chromatography (flame ionization detection, or 'FID') was used to determine the feed and product hydrocarbon compound concentrations. A thermal conductivity detector was used to determine the amount of carbon oxides formed so that the conversion could be determined. During the first 25 hours of reaction, conversion was 99.9 percent. After 60 hours, 96.5 percent conversion was observed.

Example 2

The method of Example 1 was repeated. Conversion was 99.9 percent after one hour of reaction, 99.6 percent after 50 hours, and 98.8 percent at 100 hours.

Example 3

The method of Example 1 was repeated, except the concentration of hexane in the air was about 1000 ppm. Conversion was 99.7 percent after one hour of reaction, 98.0 percent after 8 hours, and 95.6 percent after 75 hours.

Example 4

The method of Example 3 was repeated, except the reaction temperature was 200° C. Conversion was 99.8 percent after 6 hours of reaction, and decreased to 77 percent after 73 hours.

Example 5

The method of Example 2 was repeated, except the concentration of hexane in the air was about 1000 ppm and the reaction temperature was 200° C. Conversion was 99.8 percent after 7 hours of reaction, 99.1 percent at 26 hours, 97.8 percent after 30 hours, 78 percent after 48 hours, and decreased to 48 percent at 55 hours.

Example 6

The method of Example 3 was repeated, except the reaction temperature was 175° C. The conversion was 99.9 percent at 6 hours of reaction, 86 percent after 25 hours, and 54 percent after 50 hours.

After 50 hours of reaction, the hexane feed was stopped, and only 3 mL/min air at 250° C. was passed over the catalyst overnight (approximately 15 hours) to regenerate the catalyst. After regeneration, reaction was again initiated at a temperature of 175° C. After 8 hours of reaction, the conversion was 99.8 percent. Conversion fell to 56 percent after 23 hours, and to 30 percent at 29 hours.

Example 7

The method of Example 1 was repeated, except that the hexane concentration was about 1500 ppm. Conversion of 99.96 percent was achieved after 6 hours of reaction, with 99.9 percent after 30 hours, 82 percent after 47 hours, 67 percent at 72 hours, and 44 percent after 96 hours.

Example 8

The method of Example 7 was repeated at a hexane concentration of about 1000 ppm. Conversion was 99.9 percent after 7 hours, 76 percent after 24 hours, and 63 percent after 30 hours.

Example 9

The method of Example 7 was repeated with 2.0 grams of catalyst. Conversion of 99.9 percent was achieved after 72 hours of reaction, and was 50.7 percent after 96 hours. At that time, the hexane feed was stopped and air (3 mL/min) at 250° C. was passed through the catalyst bed for 25 hours. After regeneration, reaction at 175 ° C. yielded 99.8 percent conversion after 10 hours.

Example 10

The method of Example 1 was repeated with butane instead of hexane. The butane concentration was about 30,000 ppm. Conversion was 99.8 percent up to 35 hours of reaction, 97.7 percent after 100 hours, and 97.1 percent at 120 hours.

Example 11

The method of Example 2 was repeated with butane (concentration about 5000 ppm). After 25 hours of reaction, the conversion was 99.8 percent, but decreased to 50 percent at 55 hours.

Example 12

Example 10 was repeated at a reaction temperature of 175° C., but with a butane concentration of about 2000 ppm. Conversion was about 50 percent after 6 hours of reaction, about 51 percent after 25 hours, and 33 percent after 50 hours. Then, the catalyst was regenerated by stopping the butane feed and passing only air through the bed at 3 mL/min at a temperature of 250° C. After 15 hours of regeneration treatment, the catalyst temperature was adjusted to 175 ° C., and butane reactant again was introduced. Conversion was 40 percent after 8 hours, and decreased to 21 percent after 23 hours. The reaction temperature then was increased to 250° C. Conversion was 86 percent after 5 hours of reaction at the higher temperature.

Example 13

The method of Example 8 was repeated, except butane was oxidized. The butane concentration was about 2000 ppm. After 6 hours of reaction, conversion was about 99 percent. After 24 hours of reaction, conversion was 36 percent. Then, the reaction temperature was raised to 200° C. Conversion was 21 percent after 6 hours at this temperature.

Example 14

The method of Example 7 was repeated, except the hydrocarbon compound was butane and 2.0 grams of catalyst were used. The butane concentration was about 1500 ppm. Conversion was 99.0 percent after 6 hours, and decreased to 32.0 percent at 30 hours. The temperature then was raised to 250° C. Conversion was 43 percent after an additional 40 hours of reaction time at the higher temperature.

Thereafter, the catalyst was regenerated by cutting off the butane flow and passing only air (3 mL/min) through the catalyst bed at a temperature of 250° C. for 10 hours. After regeneration, reaction was carried out at a temperature of 250° C. During the first 10 hours of reaction, the conversion was about 55 percent. When the temperature was reduced to 175° C. thereafter, considerable adsorption of butane was observed.

Examples 12–14 illustrate the desirability of regenerating the catalyst. These examples illustrate the difficult nature of butane oxidation under the conditions set forth therein, and the recovery of activity resulting form regeneration of the catalyst. Comparison of the results of these examples indicates the effect of reaction temperature on degree of oxidation.

Example 15

The method of Example 1 was repeated with 2.0 grams of catalyst, toluene instead of hexane, and a reaction temperature of 210° C. The toluene concentration in the air feed stream was about 600 ppm. The conversion level exceeded 99.0 percent during the entire 105 hour reaction time.

Example 16

The method of Example 1 was repeated with 2.0 grams of catalyst used to oxidize toluene at 250° C. To increase the toluene concentration in the feed stream, the vessel containing the toluene was heated to 75° C. Thus, the concentration of toluene in the feed was about 1300 ppm. Conversion was 99.9 percent after 82 hours. At this time, water vapor (50,000 ppm) was added. Conversion after an additional 155 hours was 98.9 percent.

Example 17

Doped Kureha SARO pitch based bead catalyst was used to oxidize butane. Butane at a concentration of about 80,000 ppm was passed over two grams of the catalyst at a temperature of 200° C. For the first 6 hours, conversion exceeded 99 percent. At 22 hours, conversion was 80 percent. Then, the temperature was increased to 225° C.; the conversion after an additional 10 hours of reaction time exceeded 92 percent. The temperature was further increased to 250° C., and the conversion at 71 hours (39 hours at 250° C.), the conversion was about 94 percent.

Example 18

The method of Example 1 was repeated with the catalyst described in Table 1 above, with hexane at a concentration of about 1200 ppm as the hydrocarbon compound. During the first 6 hours of reaction, the temperature was 200° C., and the conversion of hexane to carbon dioxide was higher than 99.9 percent. Even after 22 hours at that temperature, conversion exceeded 99 percent. The temperature then was increased to 220° C., and conversion at 71 hours was about 99.8 percent.

Example 19

A 2.0 gram sample of Ambersorb ® 572 was doped with 3 wt percent of CuO, 0.3 wt percent of MnO, and 0.1 wt percent of $CeO_2$. The substrate was pore-filled with an aqueous solution of $Cu(NO_3)_2.2\frac{1}{2}H_2O$ and $(NH_4)_2Ce(NO_3)_6$, ageing for 12 hours, then heating in a vacuum at 180° C. overnight. Then, the procedure was repeated with aqueous $Mn(NO_3)_2$ solution. The catalyst was activated as described in the section entitled "Catalyst Preparation" set forth above.

Toluene at a concentration of about 600 ppm was passed through the catalyst in accordance with the method set forth in Example 1, with the exception that the reaction temperature was 180° C. Conversion exceeded 98.0 percent for the entirety of the 170-hour run.

What is claimed is:

1. A method for essentially completely oxidizing hydrocarbon compounds comprising:
   contacting the hydrocarbon compound and excess oxygen, at a temperature of from about 150° C. to about 300° C., with a catalyst comprising a carbonaceous, pyrolyzed polymer substrate having a macropore size of at least 500 Ångstrom units in average diameter, a mesopore size in the range of from about 20 to about 500 Ångstrom units in average diameter, and a micropore size of less than 20 Ångstrom units in average diameter, wherein the macropores have a volume of at least about 0.10 ml/g, the mesopores have a volume in the range of from about 0.05 to about 0.30 ml/g, and the micropores have a volume in the range of from about 0.10 to about 0.40 ml/g, the substrate being doped with a compound selected from the group consisting of metal oxides, metal oxyhalides, precursor metal salts which form, by decomposition or hydrolysis, metal oxide and metal oxyhalide, and blends thereof, said catalyst having a surface area, pore size, redox activity, acidity and pore volume sufficient to achieve complete oxidation of the hydrocarbon compound at a temperature below about 300° C., wherein the metal of the metal oxides, metal oxyhalides and precursor metal salts is selected from the group consisting of scandium, titanium, vanadium, chromium, manganese, iron, cobalt, nickel, copper, zinc, lead, niobium, zirconium, molybdenum and blends thereof.

2. The method of claim 1 wherein the hydrocarbon compound is selected from the group consisting of aromatic hydrocarbon compounds, aliphatic and alicyclic alkane, alkene, and alkyne hydrocarbon compounds, and blends thereof.

3. The method of claim 1 wherein the catalyst has a specific area in the range from about 100 $m^2/g$ to about 2000 $m^2/g$.

4. The method of claim 3 wherein the catalyst has a specific area in the range from about 600 $m^2/g$ to about 900 $m^2/g$.

5. The method of claim 1 wherein the temperature at which the hydrocarbon compound and excess oxygen contact the catalyst is between about 175° and 230° C.

6. A method for regenerating a doped carbonaceous catalyst saturated with one or more hydrocarbon compounds comprising heating the catalyst in the presence of excess oxygen, air, or mixtures of steam with oxygen or air to a temperature sufficient to completely oxidize the hydrocarbon compounds wherein the doped carbonaceous catalyst is a pyrolyzed polymer doped with at least one metal oxide, metal oxyhalide or precursor metal salt which forms, by decomposition or hydrolysis, a metal oxide or metal oxyhalide and having a macropore size of at least 500 Ångstrom units in average diameter, a mesopore size in the range of from about 20 to about 500 Ångstrom units in average diameter, and a micropore size of less than 20 Ångstrom units in average diameter, wherein the macropores have a volume of at least about 0.10 ml/g, the mesopores have a volume in the range of from about 0.05 to about 0.30 ml/g, and the micropores have a volume in the range of from about 0.10 to about 0.40 ml/g, wherein the doped carbonaceous catalyst has a pore size, pore volume, redox activity, acidity, and surface area sufficient to completely oxidize the hydrocarbon compounds, and wherein the metal of the metal oxide, metal oxyhalide or precursor metal salt is selected from the group consisting of scandium, titanium, vanadium, chromium, manganese, iron, cobalt, nickel, copper, zinc, lead, niobium, zirconium, molybdenum and blends thereof.

7. The method of claim 6 wherein the hydrocarbon compound is selected from the group consisting of aromatic hydrocarbon compounds, aliphatic and alicyclic alkane, alkene, and alkyne hydrocarbon compounds, and blends thereof.

8. The method of claim 6 wherein the catalyst has a specific area in the range from about 100 $m^2/g$ to about 2000 $m^2/g$.

9. The method of claim 6 wherein the reaction temperature is between about 150° and 300° C.

10. The method of claim 9 wherein the reaction temperature is between about 175° and 230° C.

11. A method for removing hydrocarbon compounds from soil, water and other liquids, or air comprising:
   contacting the soil, water, other liquid, or air containing the hydrocarbon compound with a catalyst comprising a carbonaceous, pyrolyzed polymer substrate having a macropore size of at least 500 Ångstrom units in average diameter, a mesopore size in the range of from about 20 to about 500 Ångstrom units in average diameter, and a micropore size of less than 20 Ångstrom units in average diameter, wherein the macropores have a volume of at least about 0.10 ml/g, the mesopores have a volume in the range of from about 0.05 to about 0.30 ml/g, and the micropores have a volume in the range of from about 0.10 to about 0.40 ml/g, the substrate being doped with at least one metal oxide, metal oxyhalide, precursor metal salt which forms, by decomposition or hydrolysis, a metal oxide, or precursor metal salt which forms, by decomposition or hydrolysis, a metal oxyhalide, at ambient temperature; destroying the hydrocarbon compound by heating the hydrocarbon compound-containing catalyst in the presence of excess oxygen, air or mixtures of steam with air or oxygen, to a temperature sufficient to catalytically oxidize the hydrocarbon compound adsorbed on the catalyst, wherein the catalyst has a pore size, pore volume, redox activity, acidity, and surface area sufficient to completely oxidize the hydrocarbon compound, and wherein the metal of the metal oxide, metal oxyhalide or precursor metal salt is selected from the group consisting of scandium, titanium, vanadium, chromium, manganese, iron, cobalt, nickel, copper, zinc, lead, niobium, zirconium, molybdenum and blends thereof.

12. The method of claim 11 wherein the hydrocarbon compound is selected from the group consisting of aromatic hydrocarbon compounds, aliphatic and alicyclic alkane, alkene, and alkyne hydrocarbon compounds, and blends thereof.

13. The method of claim 12 wherein the catalyst has a specific area in the range from about 100 $m^2/g$ to about 2000 $m^2/g$.

14. The method of claim 12 wherein the temperature sufficient to catalytically oxidize the hydrocarbon compound is between about 175° C. and 230° C.

* * * * *